United States Patent
Liu et al.

(10) Patent No.: US 10,230,613 B2
(45) Date of Patent: Mar. 12, 2019

(54) TEST SYSTEM FOR REDUCING PERFORMANCE TEST COST IN CLOUD ENVIRONMENT AND TEST METHOD THEREFOR

(71) Applicant: NAVER Business Platform Corp., Seongnam-Si, Gyeonggi-Do (KR)

(72) Inventors: Zhifei Liu, Seongnam-si (KR); Jun Ho Yoon, Seongnam-si (KR)

(73) Assignee: NAVER BUSINESS PLATFORM CORP., Gyeonggi-Do (KR)

( * ) Notice: Subject to any disclaimer, the term of this patent is extended or adjusted under 35 U.S.C. 154(b) by 682 days.

(21) Appl. No.: 14/861,095

(22) Filed: Sep. 22, 2015

(65) Prior Publication Data
US 2016/0014011 A1 Jan. 14, 2016

Related U.S. Application Data (63) Continuation of application No. PCT/KR2013/002728, filed on Apr. 2, 2013.

(30) Foreign Application Priority Data

Mar. 22, 2013 (KR) ........................ 10-2013-0030793

(51) Int. Cl.
*G06F 15/16* (2006.01)
*H04L 12/26* (2006.01)
(Continued)

(52) U.S. Cl.
CPC .............. *H04L 43/50* (2013.01); *H04L 67/10* (2013.01); *H04L 41/046* (2013.01); *H04L 67/1004* (2013.01)

(58) Field of Classification Search
CPC .................................................... H04L 67/289
See application file for complete search history.

(56) References Cited

U.S. PATENT DOCUMENTS

| | | | |
|---|---|---|---|
| 6,738,813 B1 * | 5/2004 | Reichman | G06Q 10/06 709/223 |
| 6,898,564 B1 | 5/2005 | Odhner et al. | |

(Continued)

FOREIGN PATENT DOCUMENTS

| | | |
|---|---|---|
| JP | 2002007232 A | 1/2002 |
| KR | 2009-0065747 A | 6/2009 |

(Continued)

OTHER PUBLICATIONS

Takashi, Hitomi, "Oracle Application Quality Management Method Test Quality Improvement Web application/ Oracle Database," ASCII Mediaworks Corp., 2009, Japan, First edition pp. 61-65, 108-117, ISBN:978-4-04-868091-2.

(Continued)

*Primary Examiner* — Hieu T Hoang
(74) *Attorney, Agent, or Firm* — Harness, Dickey & Pierce, P.L.C.

(57) ABSTRACT

A test method includes selecting at least one agent included in a selected network based on network information input from a user, the selected network corresponding to the network information; receiving target server information; verifying whether a server corresponding to the target server information is present in the selected network based on the network information and the target server information; and transferring the target server information to the selected at least one agent.

11 Claims, 7 Drawing Sheets

(51) Int. Cl.
*H04L 29/08* (2006.01)
*H04L 12/24* (2006.01)

(56) References Cited

U.S. PATENT DOCUMENTS

| | | | |
|---|---|---|---|
| 6,950,932 B1* | 9/2005 | Lavian | G06F 21/51 |
| | | | 709/223 |
| 7,403,886 B2 | 7/2008 | Odhner et al. | |
| 7,577,734 B2 | 8/2009 | Kakimoto | |
| 7,610,186 B2 | 10/2009 | Odhner et al. | |
| 2001/0016867 A1* | 8/2001 | Hu | G06F 11/3414 |
| | | | 709/202 |
| 2002/0120853 A1* | 8/2002 | Tyree | H04L 63/1458 |
| | | | 713/188 |
| 2003/0028828 A1 | 2/2003 | Kakimoto | |
| 2003/0074606 A1* | 4/2003 | Boker | G06F 11/3495 |
| | | | 714/42 |
| 2005/0102121 A1 | 5/2005 | Odhner et al. | |
| 2005/0102318 A1 | 5/2005 | Odhner et al. | |
| 2006/0174319 A1* | 8/2006 | Kraemer | G06F 21/53 |
| | | | 726/1 |
| 2006/0190602 A1* | 8/2006 | Canali | H04L 29/06 |
| | | | 709/226 |
| 2006/0277606 A1* | 12/2006 | Yunus | G06F 21/51 |
| | | | 726/25 |
| 2009/0156314 A1 | 6/2009 | Kim et al. | |
| 2009/0172168 A1* | 7/2009 | Sonoda | G06F 9/5061 |
| | | | 709/226 |
| 2013/0061093 A1 | 3/2013 | Choi | |

FOREIGN PATENT DOCUMENTS

| | | |
|---|---|---|
| KR | 2013-0026919 A | 3/2013 |
| WO | WO-02/086748 A1 | 10/2002 |

OTHER PUBLICATIONS

Japanese Office Action dated Nov. 8, 2016 for corresponding Japanese Patent Application No. 2016-504218.
International Search Report PCT/ISA/210 for International Application No. PCT/KR2013/002728 dated Dec. 12, 2013.

* cited by examiner

TEST SYSTEM FOR REDUCING PERFORMANCE TEST COST IN CLOUD ENVIRONMENT AND TEST METHOD THEREFOR

CROSS-REFERENCE TO RELATED APPLICATION(S)

This U.S. non-provisional patent application is a continuation of International Application PCT/KR2013/002728, filed Apr. 2, 2013 which claims priority to Korean Patent Application No. 10-2013-0030793, filed on Mar. 22, 2013, the entire contents of each of which are hereby incorporated by reference.

TECHNICAL FIELD

At least some example embodiments relate to a test system and a test method for reducing performance test cost in a cloud environment.

RELATED ART

A cloud-based test tool refers to a system for testing the performance of a target server and may be configured to borrow a pre-installed central control system and agent to meet the requirements of a user.

Figure 1:
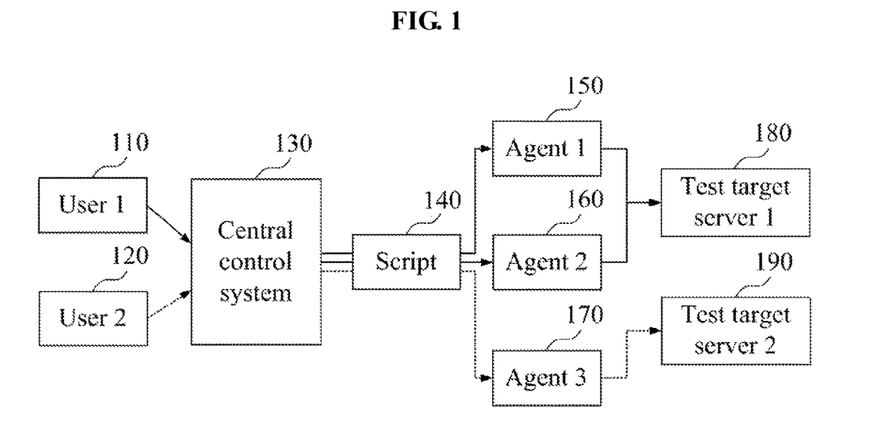
FIG. 1 is a diagram illustrating a central control system and an agent according to the related art.

FIG. 1 is a diagram illustrating a central control system and an agent according to the related art. FIG. 1 illustrates a user 1 110, a user 2 120, a central control system 130, a script 140, an agent 1 150, an agent 2 160, an agent 3 170, a test target server 1 180, and a test target server 2 190.

Users, for example, the user 1 110 and the user 2 120, may indicate users that desire to test the performance of test target servers. For example, the user 1 110 may desire to test the performance of the test target server 1 180 and the user 2 120 may desire to test the performance of the test target server 2 190. For conciseness of description, FIG. 1 illustrates two users, for example, the user 1 110 and the user 2 120, the number of users is not limited thereto.

The central control system 130 may indicate a controller for controlling the agents 150, 160, and 170 in response to a request of the users 110 and 120. In this instance, the central control system 130 may control the agents 150, 160, and 170 by transferring the script 140 that meets the requirements of the users 110 and 120 to the agents 150, 160, and 170.

The script 140 may include a command to control the agents 150, 160, and 170 in response to a request of the users 110 and 120. For example, the script 140 may include a command to control a specific agent to request a resource from a test target server of a specific host address for. The script 140 may vary based on the request of the users 110 and 120.

The agents 150, 160, and 170 may measure the performance of a corresponding server by providing load, for example, a service request, to the corresponding server, from among the test target servers 180 and 190, in response to the command of the script 140 transferred from the central control system 130. Although FIG. 1 illustrates three agents 150, 160, and 170 for conciseness of description, the number of agents is not limited thereto.

The test target servers 180 and 190 are test targets set by the users 110 and 120, and may provide a service to the agents 150, 160, and 170 in response to the load, for example, the service request, provided from the agents 150, 160, and 170. Although FIG. 1 illustrates two test target servers 180 and 190 for conciseness of description, the number of test target servers is not limited thereto.

Figure 2:
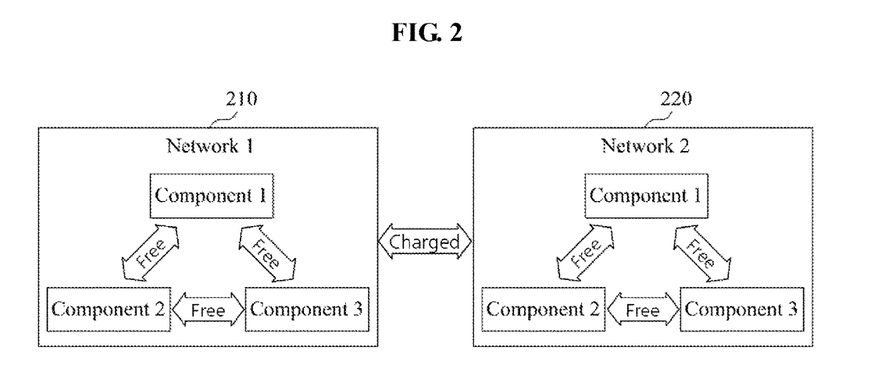
FIG. 2 is a diagram illustrating characteristics of a cloud service according to the related art.

FIG. 2 is a diagram illustrating characteristics of a cloud service according to the related art. FIG. 2 illustrates a network 1 210 and a network 2 220. Here, many cloud services are provided free of charge with respect to traffic between components within a network. However, charges will be made for traffic between different networks. For example, a fee may not be charged for traffic occurring between components within the network 1 210, and a fee may not be charged for traffic occurring between components within the network 2 220, while a fee may be charged for traffic occurring between a component of the network 1 210 and a component of the network 2 220. Accordingly, an inter-network bandwidth may be regarded to be narrow compared to an intra-network bandwidth.

Due to characteristics of the cloud service described above with reference to FIG. 2, some issues may arise in using the cloud-based test tool of FIG. 1.

Figure 3:
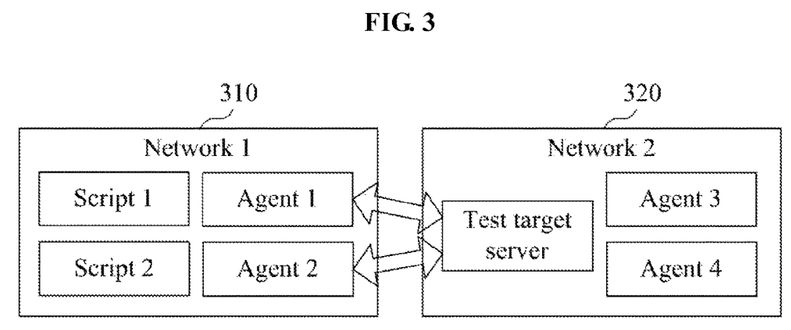
FIG. 3 is a diagram illustrating an example of transferring traffic between networks according to the related art.

FIG. 3 is a diagram illustrating an example of transferring traffic between networks according to the related art. FIG. 3 illustrates an example in which an agent 1 and an agent 2 of a network 1 310 provide load to a test target server of a network 2 320 according to control of a script 1 and a script 2, respectively, and test the performance of the test target server. In this example, as described above with FIG. 2, since a fee may be charged for traffic occurring between networks, a vender, for example, a service provider that provides a cloud-based test tool, may be charged an amount corresponding to the occurrence of inter-network traffic. Also, from the perspective of a user, the performance is measured by transferring data between networks and thus, an accuracy of a result of testing the performance of a test target server may be degraded and load may be provided by accessing any address included in a script. Thus, security issues, for example, stability issues, and other issues such as abusing may occur.

Accordingly, when an agent is already present in each network, an agent present in a corresponding network may be used to test a server within the specific network. However, in the related art, when performing a test in response to a command prepared using a script language, there may be no protecting apparatus to prevent an agent from accessing another network.

To address the aforementioned issues, a test target server may be recognized by scanning a script in advance. However, in this case, when selecting a dynamic test target server, an appropriate action may not be taken.

SUMMARY

Embodiments provide a test system and a test method that may receive information about a server of a network to be tested from a user, and may block an access to another server other than a server that is selected based on the received information.

Embodiments provide a test system and a test method that may not scan a script in advance and may limit an occurrence of unnecessary communication between networks regardless of a selection on a dynamic test target server.

According to at least some example embodiments, there is provided a test method including selecting at least one agent included in a network corresponding to network information based on the network information input from a user; verifying whether a server corresponding to target server information is present in the network corresponding to the network information based on the network information and the target server information further input from the user; and transferring the target server information to the selected at least one agent.

According to an aspect, the selected at least one agent may block an access to another server other than the server corresponding to the target server information.

According to another aspect, the selected at least one agent may operate on a Java Virtual Machine (JVM) and may block the access to the other server using a security function of the JVM.

According to still another aspect, the selected at least one agent may block the access to the other server by setting Java SecurityManager in response to driving a script engine.

Accordingly, each of the agents described herein may be implemented by, for example, one or more processors executing program code that is stored in a memory and includes instructions corresponding to the operations described herein as being performed by an agent.

According to still another aspect, the network information may include Internet Data Center (IDC) information, and the verifying whether the server corresponding to the target server information is present in the network corresponding to the network information may include verifying whether the server operates by way of an IDC corresponding to the IDC information.

According to at least some example embodiments, there is provided a test system including an agent selector configured to select at least one agent included in a network corresponding to network information based on the network information input from a user; a server verifier configured to verify whether a server corresponding to target server information is present in the network corresponding to the network information based on the network information and the target server information further input from the user; and a target server information transferor configured to transfer the target server information to the selected at least one agent.

According to at least some example embodiments, there is provided a test method including receiving, by an agent, target server information from a controller; and blocking, by the agent, an access to another server other than a server corresponding to the target server information. The target server information is information input from a user into the controller, and is transferred from the controller in response to a presence of the agent and the server corresponding to the target server information in a network corresponding to network information further input from the user.

According to at least some example embodiments, there is provided a test system included in an agent, including a target server information receiver configured to receive target server information from a controller; and an access blocker configured to block an access to another server other than a server corresponding to the target server information. The target server information may be information input from a user into the controller, and may be transferred from the controller in response to a presence of the agent and the server corresponding to the target server information in a network corresponding to network information further input from the user.

According to at least some example embodiments, by receiving information about a server of a network to be tested from a user and by blocking an access to another server other than a server selected based on the input information, it is possible to reduce unnecessary cost occurring due to inter-network traffic and to decrease a variation by a network. Accordingly, it is possible to provide a further accurate performance test result and to improve a stability.

Also, According to at least some example embodiments, there is no need to scan a script in advance, and it is possible to limit an occurrence of unnecessary communication between networks regardless of a selection on a dynamic test target server.

BRIEF DESCRIPTION OF DRAWINGS

The above and other features and advantages of example embodiments of the inventive concepts will become more apparent by describing in detail example embodiments of the inventive concepts with reference to the attached drawings. The accompanying drawings are intended to depict example embodiments of the inventive concepts and should not be interpreted to limit the intended scope of the claims. The accompanying drawings are not to be considered as drawn to scale unless explicitly noted.

DETAILED DESCRIPTION

Detailed example embodiments of the inventive concepts are disclosed herein. However, specific structural and functional details disclosed herein are merely representative for purposes of describing example embodiments of the inventive concepts. Example embodiments of the inventive concepts may, however, be embodied in many alternate forms and should not be construed as limited to only the embodiments set forth herein.

Accordingly, while example embodiments of the inventive concepts are capable of various modifications and alternative forms, embodiments thereof are shown by way of example in the drawings and will herein be described in detail. It should be understood, however, that there is no intent to limit example embodiments of the inventive concepts to the particular forms disclosed, but to the contrary, example embodiments of the inventive concepts are to cover all modifications, equivalents, and alternatives falling within the scope of example embodiments of the inventive concepts. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the inventive concepts. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments of the inventive concepts. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Example embodiments of the inventive concepts are described herein with reference to schematic illustrations of idealized embodiments (and intermediate structures) of the inventive concepts. As such, variations from the shapes of the illustrations as a result, for example, of manufacturing techniques and/or tolerances, are to be expected. Thus, example embodiments of the inventive concepts should not be construed as limited to the particular shapes of regions illustrated herein but are to include deviations in shapes that result, for example, from manufacturing.

Although corresponding plan views and/or perspective views of some cross-sectional view(s) may not be shown, the cross-sectional view(s) of device structures illustrated herein provide support for a plurality of device structures that extend along two different directions as would be illustrated in a plan view, and/or in three different directions as would be illustrated in a perspective view. The two different directions may or may not be orthogonal to each other. The three different directions may include a third direction that may be orthogonal to the two different directions. The plurality of device structures may be integrated in a same electronic device. For example, when a device structure (e.g., a memory cell structure or a transistor structure) is illustrated in a cross-sectional view, an electronic device may include a plurality of the device structures (e.g., memory cell structures or transistor structures), as would be illustrated by a plan view of the electronic device. The plurality of device structures may be arranged in an array and/or in a two-dimensional pattern.

Example embodiments disclosed herein may comprise program code including program instructions, software components, software modules, data files, data structures, and/or the like that are implemented by one or more physical hardware devices. Examples of program code include both machine code produced by a compiler and higher level program code that is executed using an interpreter. The hardware devices may include one or more processors. The one or more processors are computer processing devices configured to carry out the program code by performing arithmetical, logical, and input/output operations. Once the program code is loaded into the one or more processors, the one or more processors may be programmed to perform the program code, thereby transforming the one or more processors into special purpose processor(s).

Alternatively, or in addition to the processors discussed above, the hardware devices may include one or more Central Processing Units (CPUs), digital signal processors (DSPs), application-specific-integrated-circuits (ASICs), SoCs, field programmable gate arrays (FPGAs), or the like. In at least some cases, the one or more CPUs, SoCs, DSPs, ASICs and FPGAs, may generally be referred to as processing circuits and/or microprocessors.

The hardware devices may also include one or more storage devices. The one or more storage devices may be tangible or non-transitory computer-readable storage media, such as random access memory (RAM), read only memory (ROM), a permanent mass storage device (such as a disk drive), and/or any other like data storage mechanism capable of storing and recording data. The one or more storage devices may be configured to store program code for one or more operating systems and/or the program code for implementing the example embodiments described herein. The program code may also be loaded from a separate computer readable storage medium into the one or more storage devices and/or the one or more processors using a drive mechanism. Such separate computer readable storage medium may include a USB flash drive, memory stick, Blu-ray/DVD/CD-ROM drive, memory card, and/or other like computer readable storage medium (not shown). The program code may be loaded into the one or more storage devices and/or the one or more processors from a remote data storage device via a network interface, rather than via a computer readable storage medium. Additionally, the program code may be loaded into the one or more storage devices and/or the one or more processors from a remote computing system that is configured to transfer and/or distribute the program code over a network. The remote computing system may transfer and/or distribute the program code via a wired interface, an air interface, and/or any other like tangible or intangible medium. The one or more processors, the one or more storage devices, and/or the program code may be specially designed and constructed for the purposes of the example embodiments, or they may be known devices that are altered and/or modified for the purposes of the example embodiments.

It will be apparent to those skilled in the art that various modifications and variations can be made to the example embodiments without departing from the spirit or scope of the inventive concepts described herein. Thus, it is intended that the example embodiments cover the modifications and variations of the example embodiments provided they come within the scope of the appended claims and their equivalents.

Hereinafter, embodiments will be described with reference to the accompanying drawings.

Figure 4:
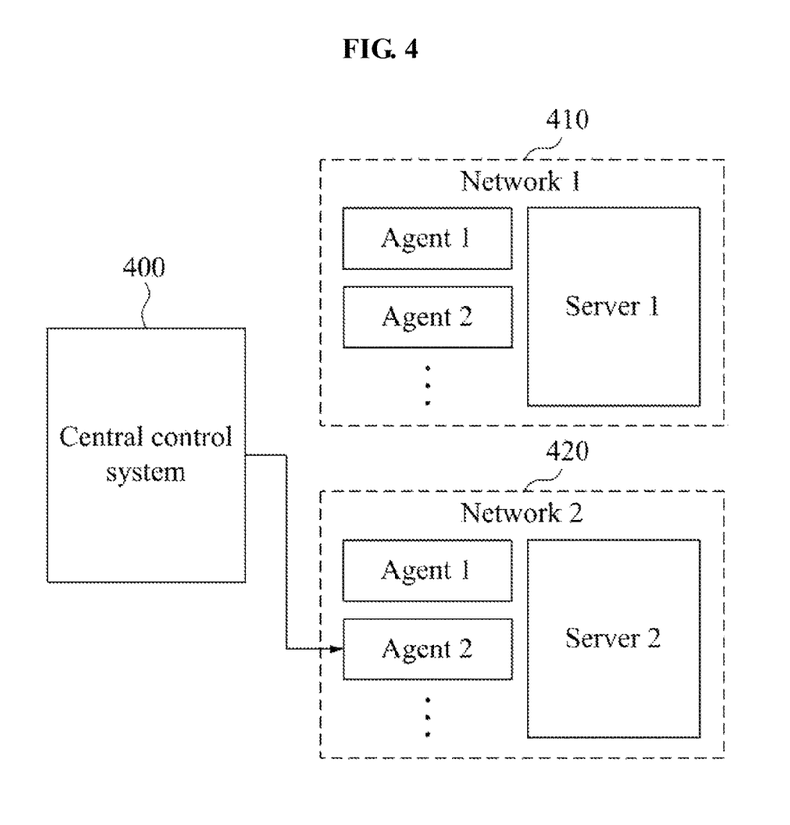
FIG. 4 is a diagram illustrating an example of a central control system and a plurality of agents according to at least one embodiment.

FIG. 4 is a diagram illustrating an example of a central control system and a plurality of agents according to at least one embodiment. FIG. 4 illustrates a central control system 400 and a plurality of agents included in a plurality of networks.

The central control system 400 may select at least one agent included in a network corresponding to network information based on the network information input from a user. For example, the network information may include Internet Data Center (IDC) information.

Also, the central control system 400 may verify whether a server corresponding to target server information is included in the network information based on the target server information input from the user. For example, the target server information may include an Internet Protocol (IP) address or a host address of a server to be tested.

In this instance, when the corresponding server is verified to be included in the corresponding network, the central control system 400 may transfer the target server information to the selected at least one agent together with a script.

The central control system 400 may be implemented by, for example, one or more processors executing program code that is stored in a memory and includes instructions corresponding to the operations described herein as being performed by the central control system 400 (or an element thereof).

In this example, the at least one agent may block an access to another server excluding the server corresponding to the target server information. For example, the at least one agent may operate on a Java Virtual Machine (JVM). In this case, the at least one agent may block the access to the other server excluding the server corresponding to the target server information using a security information of the JVM. For example, the at least one agent may prevent itself from accessing a server other than the server corresponding to the target server information, based on the target server information. The JVM may provide a function capable of blocking an access to an operating system (OS) or hardware through a security layer. In the present embodiment, an agent may control an access of a script to a network or a server by setting Java SecurityManager in response to driving a script engine.

For example, the user may access the central control system 400 and may input information about a network 2 420 as network information through a user interface provided from the central control system 400. In this example, the central control system 400 may select at least one agent included in the network 2 420, for example, an agent 2 of the network 2 420. Also, the user may input an IP address or a host address of a server 2 included in the network 2 420, as target server information through the user interface. In this case, the central control system 400 may verify the presence of the server 2 in the network 2 420 based on the target server information, for example, the IP address or the host address of the server 2 and the network information, for example, information about the network 2 420.

However, information input from the user such as the target server information or the network information may be inaccurately or erroneously input from the user, or may be input for malicious purposes. For example, the user may erroneously input network information about a network 1 410 and target server information about the server 2 of the network 2 420. In this case, the central control system 400 may verify whether the server 2 is present in the network 1 410 based on the network information and the target server information, and may verify that the user has input incorrect information since the server 2 is absent in the network 1 410.

Also, an agent according to embodiments may fundamentally block an access to another server other than a server corresponding to target server information through a script. For example, target server information input from the user may differ from information of a server to access through a script. When a server corresponding to target server information is the server 2 of the network 2 420 and a server to access through a script is a server 1 of the network 1 410, the agent may block an erroneous access by blocking an access to the server 1. In this case, the central control system 400 may alert the user or may inform a manager about an input of the inaccurate information.

Load is provided to a test target server present in a network selected at an agent present in the selected network. Thus, from the perspective of a provider that provides a performance test service, an occurrence of unnecessary cost may be prevented by blocking inter-network communication, for example, cross-IDC communication. Also, from the perspective of a user, the user may utilize a further accurate performance test result by reducing a variation by a network.

Also, the central control system 400 may automatically register target server information based on a script after initially executing the script. Accordingly, it is possible to reduce inconvenience that the user is to separately input target server information about the same test target server.

Figure 5:
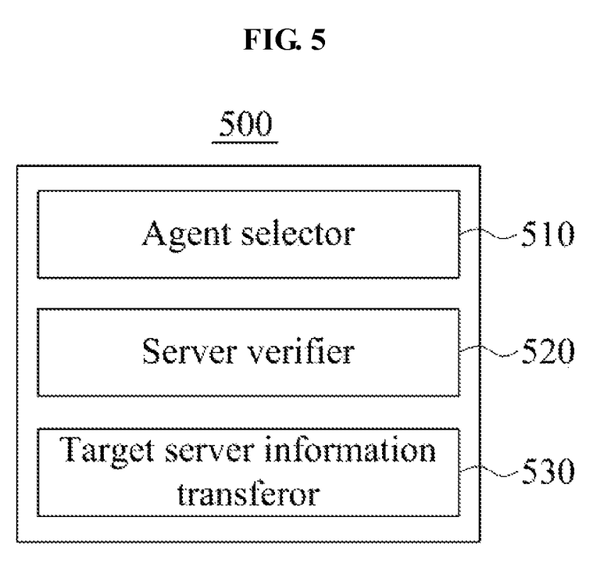
FIG. 5 is a block diagram illustrating a configuration of a test system according to at least one embodiment.
Figure 6:
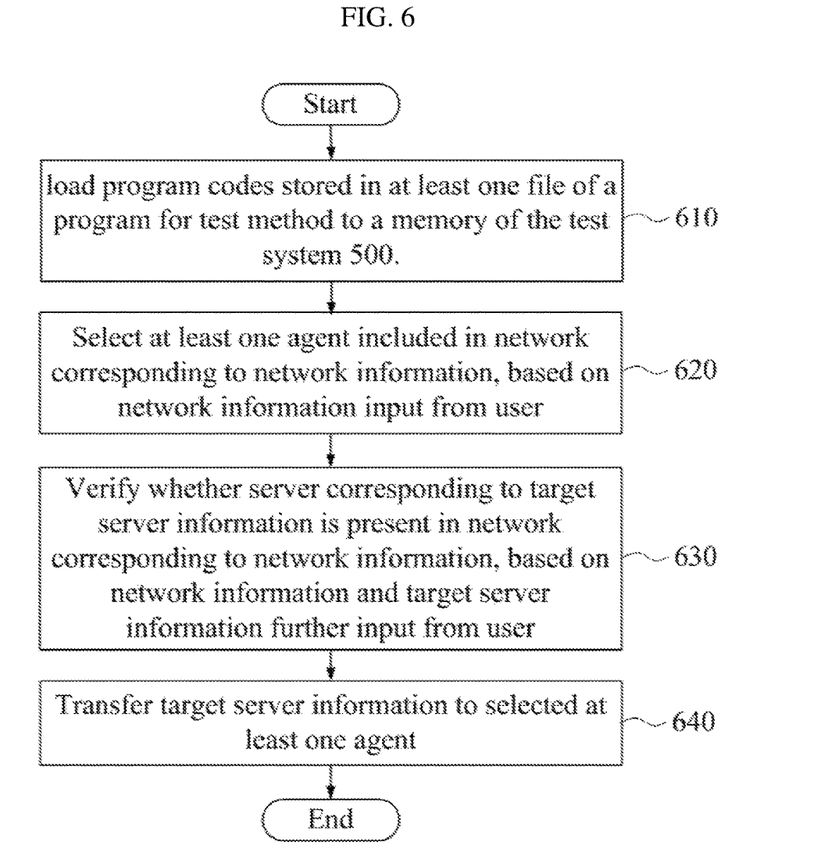
FIG. 6 is a flowchart illustrating a test method according to at least one embodiment.

FIG. 5 is a block diagram illustrating a configuration of a test system according to at least one embodiment, and FIG. 6 is a flowchart illustrating a test method according to at least one embodiment. A test system 500 according to the embodiment of FIG. 5 may correspond to, for example, the central control system 400 of FIG. 4. The central test system 500 may be implemented by, for example, one or more processors executing program code that is stored in a memory and includes instructions corresponding to the operations described herein as being performed by the test control system 500 (or an element thereof).

Referring to FIG. 5, the test system 500 may include an agent selector 510, a server verifier 520, and a target server information transferor 530. The test method according to the embodiment of FIG. 6 may be performed by the test method 500 or a separate component included in the test system 500.

In operation 610, one or more processors of the test system 500 may load program codes stored in at least one file of a program for test method to a memory of the test system 500. For example, the program may be installed the test system 500 using the at least one file. When the program is executed, the one or more processors may load the program cods from the at least one file to the memory.

Each of the agent selector 510, the server verifier 520, and the target server information transferor 530 may be configured to execute a corresponding part of the program codes in the memory to process operation 620 to 640.

In operation 620, the test system 500 or the agent selector 510 may select at least one agent included in a network corresponding to network information, based on the network information input from a user. For example, the network information may include IDC information. In this example, the test system 500 or the agent selector 510 may select the at least one agent based on the IDC information.

In operation 630, the test system 500 or the server verifier 520 may verify whether a server corresponding to target server information is present in the network corresponding to the network information, based on the network information and the target server information further input from the user. For example, the target server information may include an IP address or a host address of the server.

In operation 640, the test system 500 or the target server information transferor 530 may transfer the target server information to the selected at least one agent if the verification in operation 630 indicates that the sever corresponding to the target server information is present in the network corresponding to the network information. Further, according to at least one example embodiment, if the verification in operation 630 indicates that the sever corresponding to the target server information is not present in the network corresponding to the network information, the test system 500 or the target server information transferor 530 may not transfer the target server information to the selected at least one agent. Here, the selected at least one agent may block an access to another server excluding the server corresponding to the target server information. For example, the selected at least one agent may attempt to access a specific server based on a script transferred. Here, the when the specific server is not the server corresponding to the target server information, the selected at least one agent may block the attempt to access the specific server using the script. For example, the access to the specific server may be blocked using a security function of a JVM. As described above, the JVM may provide a function capable of blocking an access to an OS or hardware through a security layer. The selected at least one agent may control an access of a script to a network or a server by setting Java SecurityManager in response to driving a script engine.

Figure 7:
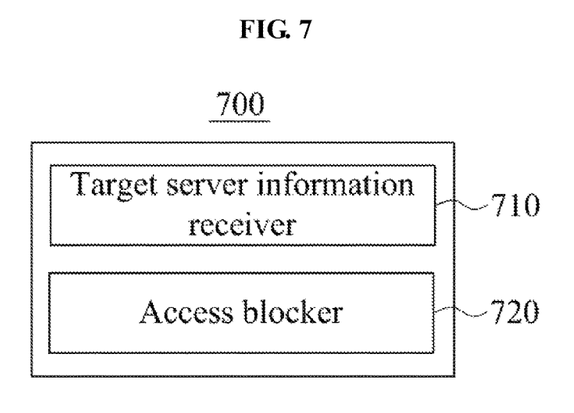
FIG. 7 is a block diagram illustrating a configuration of a test system according to at least another embodiment.
Figure 8:
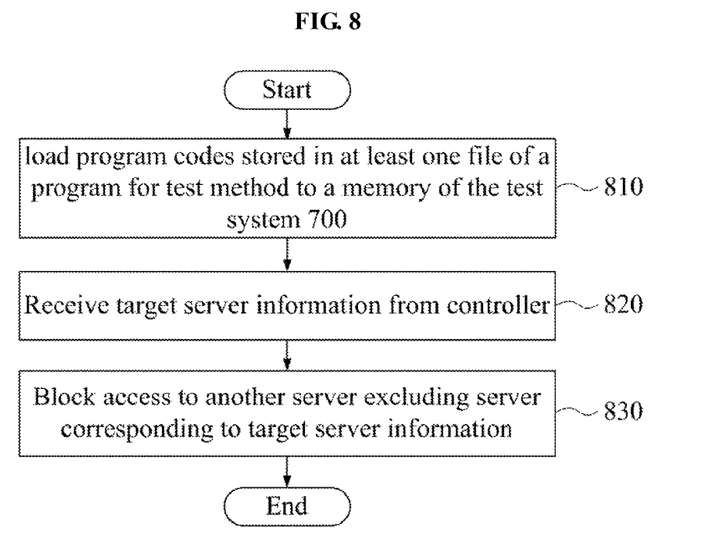
FIG. 8 is a flowchart illustrating a test method according to at least another embodiment.

FIG. 7 is a block diagram illustrating a configuration of a test system according to another embodiment, and FIG. 8 is a flowchart illustrating a test method according to another embodiment. A test system 700 according to the embodiment of FIG. 7 may correspond to at least one agent described above with reference to FIG. 4. Referring to FIG. 7, the test system 700 may include a target server information receiver 710 and an access blocker 720. The test method according to the embodiment of FIG. 8 may be performed by the test system 700 or a separate component included in the test system 700.

The test system 700 may be implemented by, for example, one or more processors executing program code that is stored in a memory and includes instructions corresponding to the operations described herein as being performed by the test system 700 (or an element thereof).

In operation 810, one or more processors of the test system 700 may load program codes stored in at least one file of a program for test method to a memory of the test system 700. For example, the program may be installed the test system 700 using the at least one file. When the program is executed, the one or more processors may load the program cods from the at least one file to the memory.

Each of the target server information receiver 710 and the access blocker 720 may be configured to execute a corresponding part of the program codes in the memory to process operation 820 and 830.

In operation 820, the test system 700 or the target server information receiver 710 may receive target server information from a controller. Here, the controller may correspond to the central control system 400 of FIG. 4 or the test system 500 of FIG. 5. Also, the target server information refers to information input from a user into the controller. When the test system 700 and a server corresponding to the target server information are present in a network corresponding to network information further input from the user, the target server information may be transferred from the controller.

In operation 830, the test system 700 or the access blocker 720 may block an access to another server other than the server corresponding to the target server information. Here, the test system 700 or the access blocker 720 may block the access to the other server (i.e., a server that is not the server corresponding to the target server information) using a security function of a JVM in operation 820. For example, the test system 700 or the access blocker 720 may block the access to the other server by setting Java SecurityManager in response to driving a script engine.

As described above, according to at least some example embodiments, by receiving information about a server of a network to be tested from a user and by blocking an access to another server other than a server selected based on the input information, it is possible to reduce unnecessary cost occurring due to inter-network traffic and to decrease a variation by a network. Accordingly, it is possible to provide a further accurate performance test result and to improve a stability. Also, According to at least some example embodiments, there is no need to scan a script in advance and it is possible to limit an occurrence of unnecessary communication between networks regardless of a selection on a dynamic test target server.

The apparatuses described herein may be implemented using hardware components, software components, and/or a combination thereof. For example, the apparatuses and the components described in the embodiments may be implemented using at least one special purpose computer, for example, a processor, a controller, an arithmetic logic unit (ALU), a digital signal processor, a microcomputer, a field programmable array (FPA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and/or multiple types of processing elements. For example, a processing device may include multiple processors or a processor and a controller. In addition, different processing configurations are possible, such as parallel processors, multi-core processors, distributed processing, or the like.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, and/or computer storage medium or device. The software also may be distributed over network coupled computer systems so that the software is stored and executed in a distributed fashion. The software and data may be stored by one or more computer readable recording mediums.

The methods according to the above-described embodiments may be recorded in non-transitory computer-readable media including program instructions to implement various operations of the above-described embodiments. The media may also include, alone or in combination with the program instructions, data files, data structures, and the like. The program instructions recorded on the media may be those specially designed and constructed for the purposes of some embodiments, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The above-described devices may be configured to act as one or more software modules in order to perform the operations of the above-described embodiments, or vice versa.

While some embodiments have been particularly shown and described, it will be understood by one of ordinary skill in the art that variations in form and detail may be made therein without departing from the sprit and scope of the claims. For example, appropriate results may be achieved although the described features or aspects within each device or method according to the embodiments are performed in order different from the described methods, and/or the components such as a system, a structure, device, and a circuit are combined or coupled in a form different from that of the described methods, and/or are replaced or substituted with other components or equivalents thereof.

Example embodiments of the inventive concepts having thus been described, it will be obvious that the same may be varied in many ways. Such variations are not to be regarded as a departure from the intended spirit and scope of example embodiments of the inventive concepts, and all such modifications as would be obvious to one skilled in the art are intended to be included within the scope of the following claims.

What is claimed is:

1. A test method comprising:
   selecting at least one agent included in a selected network based on network information input from a user, the selected network corresponding to the network information;
   receiving target server information;
   verifying whether a server corresponding to the target server information is present in the selected network based on the network information and the target server information; and
   transferring the target server information to the selected at least one agent.

2. The test method of claim 1, further comprising:
   blocking, by the selected at least one agent, an access to one or more servers other than the server corresponding to the target server information.

3. The test method of claim 1, further comprising:
   blocking, by the selected at least one agent, an access to one or more servers other than the server corresponding to the target server information,
   wherein the selected at least one agent operates on a Java Virtual Machine (JVM) and the blocking includes blocking the selected at least one agent from accessing the one or more other servers using a security function of the JVM.

4. The test method of claim 3, wherein the blocking includes blocking the selected at least one agent from accessing the one or more other servers by setting Java SecurityManager in response to driving a script engine.

5. The test method of claim 1, wherein the network information comprises Internet Data Center (IDC) information, and
   the verifying comprises:
      verifying whether the server operates by way of an IDC corresponding to the IDC information.

6. A test method comprising:
   receiving, by an agent, target server information from a controller, the target server information indicating a server corresponding to the target server information; and
   blocking, by the agent, the agent from accessing a first server in response to determining, by the agent, that the first server is a server other than the server corresponding to the target server information,
   wherein the target server information is information input from a user into the controller, and is transferred from the controller in response to a presence of the agent and the server corresponding to the target server information in a network corresponding to network information further input from the user.

7. The test method of claim 6, wherein the blocking comprises: blocking the access to the first server using a security function of a Java Virtual Machine (JVM).

8. The test method of claim 7, wherein the blocking comprises: blocking the access to the first server by setting Java Security Manager in response to driving a script engine.

9. A non-transitory computer-readable recording medium storing a program to implement the method according to claim 1.

10. A test system comprising:
    a memory storing program code including computer-readable instructions; and
    one or more processors configured to execute the computer-readable instructions to,
       select at least one agent included in a selected network based on network information input from a user, the selected network corresponding to the network information;
       receive target server information;
       verify whether a server corresponding to the target server information is present in the selected network based on the network information and the target server information; and
       transfer the target server information to the selected at least one agent.

11. A test system included in an agent, comprising:
    a memory storing program code including computer-readable instructions; and
    one or more processors configured to execute the computer-readable instructions to;
    receive target server information from a controller, the target server information indicating a server corresponding to the target server information; and
    block the agent from accessing a first server in response to determining that the first server is a server other than the server corresponding to the target server information,
    wherein the target server information is information input from a user into the controller, and is transferred from the controller in response to a presence of the agent and the server corresponding to the target server information in a network corresponding to network information further input from the user.

* * * * *